United States Patent
Dalal et al.

(10) Patent No.: US 12,291,141 B2
(45) Date of Patent: May 6, 2025

(54) HEADLIGHT ADJUSTMENT SYSTEM WITH MEASURING ASSEMBLY INCLUDING OPTICAL BEAM EXTENDING PAST AN ARTICULATING REFERENCE

(71) Applicant: Toyota Motor Engineering & Manufacturing North America, Inc., Plano, TX (US)

(72) Inventors: Sunil Dalal, Canton, MI (US); John D. Harkleroad, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/206,145

(22) Filed: Jun. 6, 2023

(65) Prior Publication Data

US 2024/0409024 A1 Dec. 12, 2024

(51) Int. Cl.
*B60Q 1/08* (2006.01)
*B60Q 1/068* (2006.01)
*B60Q 1/076* (2006.01)

(52) U.S. Cl.
CPC ............ *B60Q 1/068* (2013.01); *B60Q 1/076* (2013.01); *B60Q 1/08* (2013.01)

(58) Field of Classification Search
CPC ........ B60Q 1/0686; B60Q 1/076; B60Q 1/08; B60Q 1/10–115; G01M 11/06; G01M 11/062; F21S 41/657
See application file for complete search history.

(56) References Cited

U.S. PATENT DOCUMENTS

| | | |
|---|---|---|
| 3,596,837 A | 8/1971 | Todd et al. |
| 3,784,810 A | 1/1974 | Andres et al. |
| 3,841,759 A | 10/1974 | Turner |
| 3,903,984 A | 9/1975 | Andres et al. |
| 4,017,189 A | 4/1977 | Bischoff, Jr. |
| 4,802,067 A | 1/1989 | Ryder et al. |
| 4,922,387 A | 5/1990 | Ryder et al. |

(Continued)

FOREIGN PATENT DOCUMENTS

| | | | | |
|---|---|---|---|---|
| DE | 102013221926 A1 | * | 4/2015 | ........... B60Q 1/0023 |
| DE | 102016004371 A1 | * | 2/2017 | |

OTHER PUBLICATIONS

Machine translation of DE102013221926A1, retrieved from worldwide.espacenet.com on Apr. 23, 2024. (Year: 2024).*

(Continued)

*Primary Examiner* — Abdulmajeed Aziz
*Assistant Examiner* — Steven Y Horikoshi
(74) *Attorney, Agent, or Firm* — Christopher G. Darrow; Darrow Mustafa PC

(57) ABSTRACT

Systems, methods, and other embodiments described herein relate to vehicle headlight calibration. In one embodiment, a headlight adjustment system includes a headlight positioned in a vehicle with a measuring assembly attached to the headlight. An adjust system is connected to the moving assembly and a moving mechanism. In response to an optical beam of the measuring assembly extending past an articulating reference member of the measuring assembly to an optical receptor of the measuring assembly, the moving mechanism physically alters a configuration of the headlight.

9 Claims, 2 Drawing Sheets

(56) References Cited

U.S. PATENT DOCUMENTS

| | | | |
|---|---|---|---|
| 5,032,964 A * | 7/1991 | Endo | B60Q 1/0686 |
| | | | 362/462 |
| 5,077,642 A | 12/1991 | Lisak et al. | |
| 5,140,503 A | 8/1992 | Lisak | |
| 5,164,785 A | 11/1992 | Hopkins et al. | |
| 5,373,357 A | 12/1994 | Hopkins et al. | |
| 5,450,676 A * | 9/1995 | Thornsberry | G01C 9/06 |
| | | | 33/366.16 |
| 6,049,171 A | 4/2000 | Stam et al. | |
| 6,429,594 B1 | 8/2002 | Stam et al. | |
| 6,474,850 B1 | 11/2002 | Burton | |
| 6,647,634 B2 * | 11/2003 | Yang | G01C 9/32 |
| | | | 33/366.23 |
| 8,582,091 B2 | 11/2013 | Ekladyous et al. | |
| 9,863,843 B2 | 1/2018 | Ekladyous et al. | |
| 10,414,453 B2 | 9/2019 | Magill et al. | |
| 10,527,519 B2 | 1/2020 | Ekladyous et al. | |
| 10,894,803 B2 | 1/2021 | Morere et al. | |
| 11,022,519 B2 | 6/2021 | Ekladyous et al. | |
| 11,370,351 B2 | 6/2022 | Sugimoto | |
| 2003/0107898 A1 * | 6/2003 | Smith | B60Q 11/00 |
| | | | 362/465 |
| 2006/0048400 A1 * | 3/2006 | Huang | G01C 9/34 |
| | | | 33/366.23 |
| 2009/0086496 A1 * | 4/2009 | Todani | B60Q 1/10 |
| | | | 362/465 |
| 2017/0166108 A1 * | 6/2017 | Warren | B60Q 1/18 |
| 2019/0299845 A1 * | 10/2019 | Imamura | B60Q 1/076 |
| 2021/0116240 A1 * | 4/2021 | Srinivasan | G01C 9/10 |

OTHER PUBLICATIONS

Machine translation of DE102016004371A1, retrieved from worldwide.espacenet.com on Apr. 23, 2024. (Year: 2024).*

* cited by examiner

HEADLIGHT ADJUSTMENT SYSTEM WITH MEASURING ASSEMBLY INCLUDING OPTICAL BEAM EXTENDING PAST AN ARTICULATING REFERENCE

TECHNICAL FIELD

The subject matter described herein relates, in general, to vehicle headlights and, more particularly, to systems that calibrate installed headlights.

BACKGROUND

Headlights can be difficult to precisely calibrate. Manual adjustment of an installed headlight can result in inaccurate headlight operation or relatively long calibration procedures. Time-consuming operations can burden the efficiency and profitability of vehicle assembly.

While a headlight may safely operate with slight misalignments, the ability to optimize headlight adjustment accuracy with minimal manual influence can allow vehicle assembly to be streamlined with less opportunity for errors. Hence, there is a continued goal to automate headlight adjustment operations to provide greater headlight calibration accuracy than manual headlight adjustments during vehicle manufacturing.

SUMMARY

In one embodiment, an example system relates to a manner of improving the speed and accuracy of headlight alignment in a vehicle.

In an example embodiment, a headlight adjustment system is disclosed. The headlight adjustment system includes a headlight positioned in a vehicle and attached to a measuring assembly. An adjust system is connected to the measuring assembly and a moving mechanism that alters the configuration of the headlight in response to an optical beam of the measuring assembly extending past an articulating reference member to an optical receptor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the speed and accuracy of calibrating a headlight are disclosed herein. As previously described, adjustment and calibration of a headlight installed in a vehicle can be time-consuming and imprecise when done manually.

In this way, the disclosed systems, methods, and other embodiments improve how headlights are calibrated after installation by automating headlight alignment. By automating headlight alignment, assembly and calibration of a vehicle can be streamlined. The use of optical and gravity mechanisms to trigger automated headlight adjustments allows for increased calibration accuracy and speed compared to manual headlight calibration. For instance, automated headlight adjustment in accordance with various embodiments can provide accuracy within 0.02 degrees from a calibration threshold while manual headlight calibration can merely achieve threshold accuracy of approximately 0.4 degrees.

Figure 1:
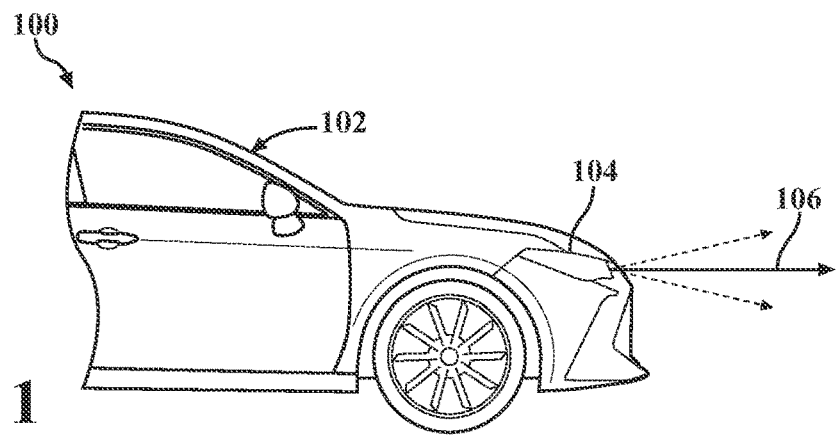
FIG. 1 illustrates an example environment in which assorted embodiments of a headlight adjustment system can be implemented.

An example environment 100 in which assorted embodiments of a headlight adjustment system can be practiced is illustrated in FIG. 1. A vehicle 102 employs one or more headlights 104 to illuminate downrange surfaces and objects. The proper alignment of a headlight 104 in the vehicle 102 can produce one or more headlight beams 106 that illuminate downrange aspects without blinding oncoming pedestrians and motorists. A misaligned headlight 104 can produce beams of light, as shown by segmented arrows, that are inefficient and/or unsafe for driving conditions.

It is noted that a headlight 104 can be employed in nearly any moving assembly. For instance, proper headlight 104 alignment can be important for tractors, commercial trucks, recreation vehicles, and service devices that are powered by electricity and/or internal combustion engine operation. Calibration of a headlight 104, in some embodiments, can involve manual manipulation or manual activation of manipulating motors, but such procedures can be time-consuming and/or imprecise, particularly during times when a headlight 104 is to be recalibrated after an event, such as a wreck, impact, or part replacement.

Figure 2:
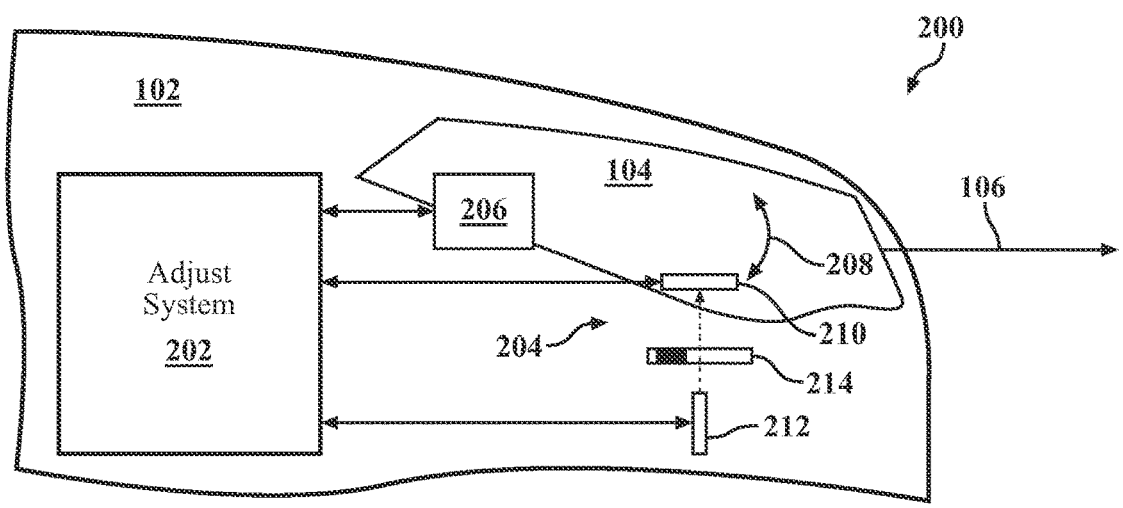
FIG. 2 illustrates one embodiment of a headlight adjustment system that can be employed in the vehicle environment of FIG. 1 in some embodiments.

FIG. 2 illustrates portions of an example headlight adjustment system 200 that provides automated headlight calibration in the vehicle environment 100 of FIG. 1 in accordance with various embodiments. A vehicle 102 can have an on-board adjust system 202 that directs measurement and adjustment of a headlight 104 by detecting headlight 104 position with a measuring assembly 204. The measuring assembly 204 can trigger the adjust system 202 to activate and control one or more moving mechanisms 206, such as a motor, solenoid, actuator, crank, pulley, or other electrically articulatable component, to manipulate the physical orientation of the headlight 104, as conveyed by arrow 208.

While not required or limiting, the measuring assembly 204 has an optical receptor 210 that is connected to the adjust system 202 and positioned opposite an optical source 212, such as a laser, frequency generator, or light source. Activation of the optical source 212 by the adjust system 202 creates a measuring beam, as shown by the segmented arrow, that identifies headlight 104 misalignment when reaching the optical receptor 210. That is, the adjust system 202 can correlate the optical beam reaching the optical receptor 210 with the headlight 104 having an incorrect physical position within the vehicle 102. It is noted that headlight 104 misalignment may involve an entire headlight housing or only a portion of a headlight 104, such as a light source within a correctly positioned housing, having an incorrect position.

The optical receptor 210 and optical source 212 components of the measuring assembly 204 are configured to be stationary while a reference member 214 articulates to match the motion of the headlight 104. In other words, a headlight 104 and reference member 214 are physically configured to move in unison, which allows the reference member 214 to identify the orientation of the headlight 104 for the measuring assembly 204. Some embodiments of the reference member 214 provide a level portion that responds to gravity to indicate the alignment of the headlight 104. For instance, the reference member 214 can have a sliding aspect, such as liquid mercury or an opaque structure, that blocks the measuring beam from reaching the optical receptor 210 when the headlight 104 is oriented in a predetermined configuration. In this way, the reference member 214 indicates to the adjust system 202 that a headlight 104 is properly calibrated when the optical receptor 210 stops receiving the measuring beam.

As a non-limiting example of operation of the headlight adjustment system 200, the adjust system 202 can continuously activate one or more moving mechanisms 206 while a measuring beam extends past the reference member 214 to reach the optical receptor 210. Once the optical receptor 210 stops receiving a measuring beam, the adjust system 202 can deactivate the moving mechanism 206 to stop altering the physical configuration of the headlight 104. It is contemplated that the headlight 104 is physically locked in place in response to the reference member 214 blocking the measuring beam from reaching the optical receptor 210. The relatively simple operation of the reference member 214 responding to gravity and orientation of the headlight 104 allows for efficient and precise adjustment in an automated manner via the adjust system 202 and activation/deactivation of the moving mechanisms 206.

Various embodiments of the headlight adjustment system 200 operate to reliably configure a headlight 104 to a predetermined alignment and orientation after physical installation of the headlight 104 into the vehicle 102. That is, the headlight adjustment system 200 can automatically correct headlight 104 misalignments with the moving mechanism 206 and measuring assembly 204 without human interaction, which can optimize headlight calibration speed and accuracy. The adjust system 202 can, in other embodiments, carry out a calibration strategy in response to installation, or known misalignment, of a headlight 104 that provides intelligent alteration of headlight 104 configuration to optimize accuracy of headlight beam 106 orientation.

Figure 3:
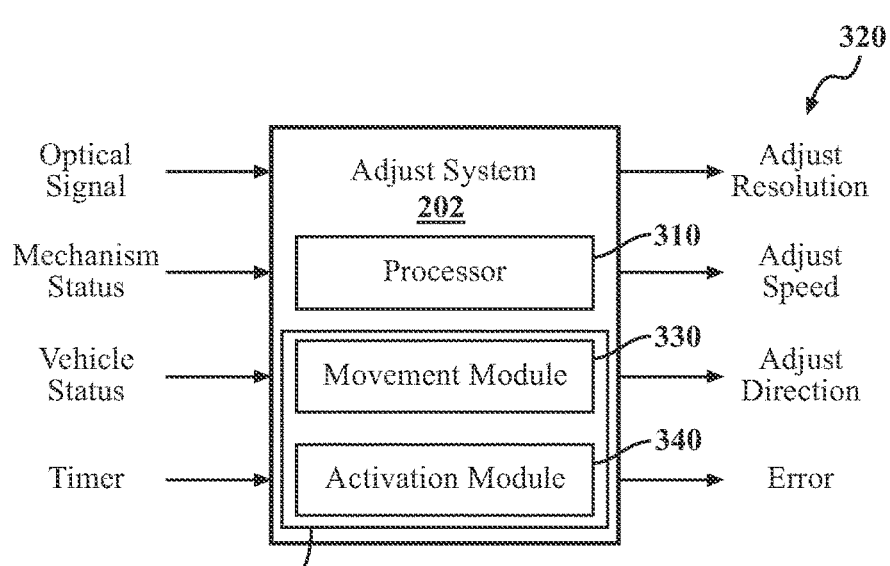
FIG. 3 illustrates an example adjust system that can be utilized as part of a headlight system in accordance with various embodiments.

FIG. 3 illustrates a block representation of an example adjust system 202 that can be employed in the vehicle environment 100 of FIG. 1, as depicted in the headlight adjustment system 200 of FIG. 2. The adjust system 202 can employ any number of local, or remote, processors 310 to translate input information into at least headlight adjustment actions intended to arrange the headlight 104 so that the reference member 214 blocks the measuring beam from reaching the optical receptor 210 of the measuring assembly 204, as shown in FIG. 2. The system processor 310 may be any programmable circuitry that is physically located within a vehicle 102 or located external to a vehicle 102 while communicating with the vehicle 102 via one or more wired and/or wireless data pathways.

The adjust system 202 can input assorted information from a connected measuring assembly 204 and vehicle 102 to proactively create one or more calibration strategies 320 that define how a headlight 104 is to be adjusted over time in an attempt to align the headlight 104 to a predetermined configuration. Non-limiting embodiments of the adjust system 202 input an electrical signal that indicates if an optical receptor 210 is receiving an optical beam originating from the optical source 212 of the measuring assembly 204, a status of the moving mechanism(s) acting on a headlight 104, a status of the vehicle 102 as a whole, and a clock timer to control the speed, resolution, and direction of headlight adjustment, as directed by the processor 310.

A movement module 330 generally includes instructions that function to control the processor 310 to receive data inputs from one or more sensors of the vehicle 102. The inputs are, in one embodiment, observations of one or more objects in an environment proximate to the vehicle 102 and/or other aspects about the surroundings. As provided for herein, the movement module 330, in one embodiment, is resident as hardware and/or software that acquires sensor data and choreographs motion of a headlight 104. The movement module 330 can prescribe any number of actions and/or series of actions that alter the orientation of a headlight 104. The movement module 330 can generate, maintain, and execute one or more calibration strategies 320 that move a headlight 104 into a predetermined configuration relative to a vehicle 102 based on at least one sensed condition. As an example, a movement module 330 can prescribe a first calibration strategy 320 that prescribes quick, but relatively imprecise, headlight motion that is triggered in response to a timer or input vehicle status and a second calibration strategy 320 that prescribes relatively slow, but precise, motion to be conducted in response to other status conditions.

Headlight adjustment resolution can be characterized as the smallest change in headlight configuration that can be enacted by a moving mechanism. For instance, some moving mechanisms allow for different step-wise amounts of movement, such as a micrometer or hundredths of a degree of rotation, by engaging different motors, different gears, or different portions of a headlight. As a result, the processor 310 can choose to adjust a headlight 104 with relatively large increments or relatively small increments, which can increase efficiency and decrease power usage of the moving mechanism(s).

The processor 310 can alter headlight motion speed, as prescribed by the movement module 330, to provide a variety of motion capabilities. A calibration strategy 320, in some embodiments, prescribes slowing headlight adjustment speed in response to an amount of time, a sensed headlight position, or a change in optical measuring beam behavior to increase efficiency, speed, and/or accuracy. The ability to adjust headlight motion speed and direction along with the resolution of motion allows the adjust system 202 to provide a diverse range of automated headlight adjustments that can be catered to different goals, such as power consumption, overall time, and precision of headlight beam conformance to a predetermined threshold.

At any time, the adjust system 202 can calculate an adjustment error for any portion of headlight adjustment. For example, the system processor 310 can evaluate past and/or current performance of a measuring assembly 204 and/or moving mechanism to determine actual physical error along with measurement errors. Such error identification can enable the adjust system 202 to institute corrective actions and/or implement corrective measuring factors to provide accurate measurement of headlight position as well as operation of measuring and moving aspects of a headlight adjustment system 200.

It is contemplated that once a headlight 104 is initially calibrated, an activation module 340 signals to the system processor 310 to deactivate the moving mechanism 206 and measuring assembly 204 of a vehicle 102. The activation module 340 generally includes instructions that function to control the processor 310 to receive data inputs from one or more sensors of the vehicle 102. The inputs are, in one embodiment, observations of one or more objects in an environment proximate to the vehicle 102 and/or other aspects about the surroundings. As provided for herein, the activation module 340, in one embodiment, is resident as hardware and/or software that selects when the moving mechanism and measuring assembly are to be active and operate to measure headlight configuration.

Such activation module 340 deactivation can lock the position of the headlight 104 to ensure the headlight configuration does not change in response to normal vehicle movement, bumps, and events. Some embodiments of the adjust system 202 may reactivate headlight adjustment means after an initial calibration. For instance, the activation module 340 can prompt the system processor 310 to reactivate and readjust a headlight 104 in response to a manual instruction from a technician and/or indication that a headlight 104 has become misaligned, such as after a collision or abnormal impact.

Various portions of a calibration strategy 320 can be stored in a local memory 350 of the adjust system 202. Such local memory 350 may be volatile or non-volatile with any capacity and data storage performance capabilities. It is contemplated that the adjust system 202 generates more than one calibration strategy 320 that is stored in the local memory 350 or downloaded from a remote node and executed from the local memory 350. The storage of executable software and code in local memory 350, either permanently or temporarily, allows the system processor 310 to efficiently respond to changing conditions or headlight adjustment measurements. For example, the system processor 310 can react to the expiration of an adjustment timer by changing adjustment resolution and/or speed. Another non-limiting example executes strategy actions stored in local memory 350 in response to the identification that an adjustment resolution is not providing a precise enough movement to meet the accuracy threshold prescribed by the calibration strategy 320.

Figure 4:
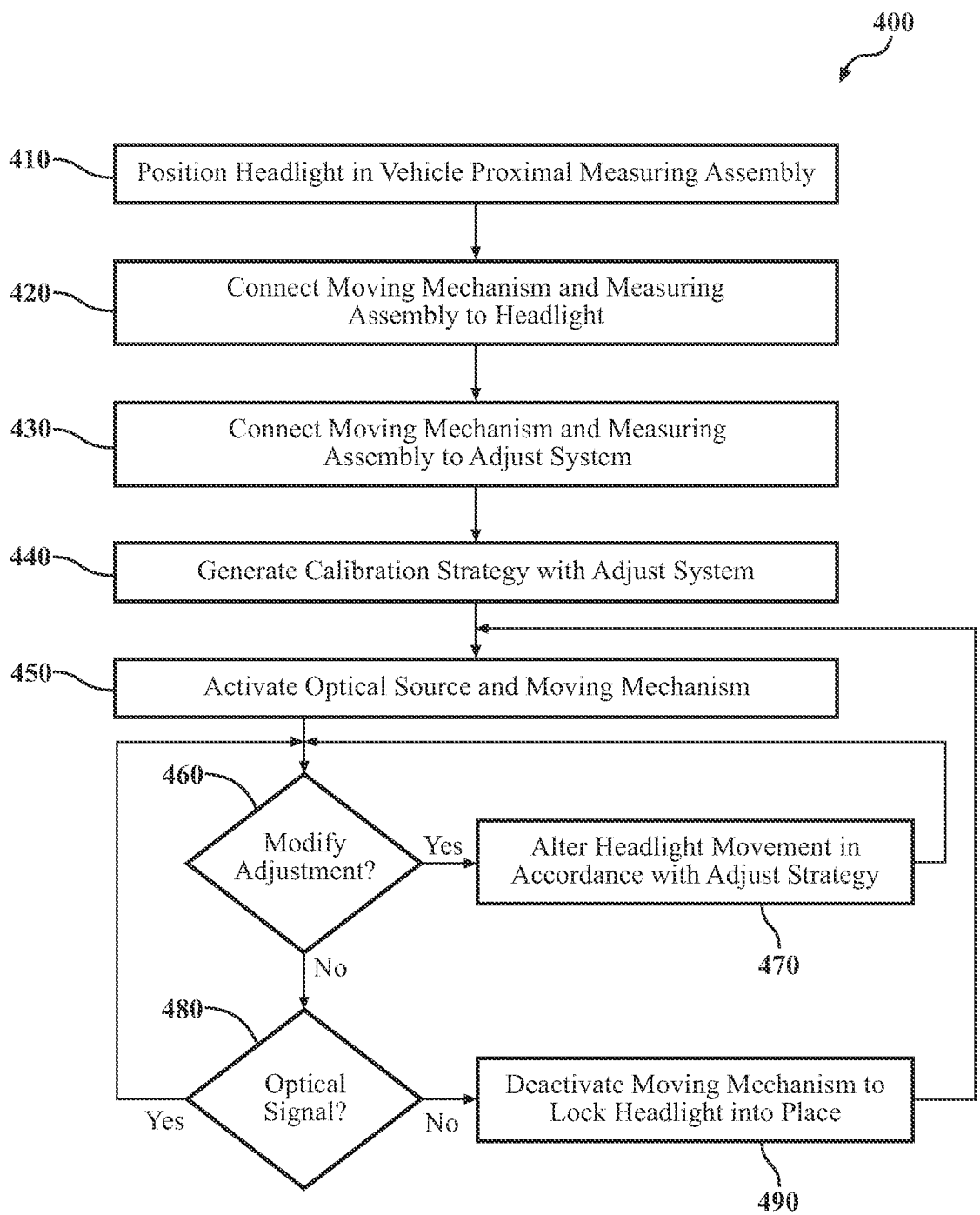
FIG. 4 illustrates a flowchart for one embodiment of a method that can be carried out by the assorted embodiments of a headlight adjustment system of FIGS. 2 and 3.

FIG. 4 is a flowchart of an example headlight adjustment routine 400 that can be carried out with the adjust system 202 of FIG. 3 as part of a headlight adjustment system 200 of FIG. 2 in the vehicle environment 100 of FIG. 1. During manufacturing and assembly of a vehicle 102, step 410 initially positions a headlight 104 in a headlight aperture of the vehicle 102 where a measuring assembly 204 resides. The positioning of a headlight 104 in step 410 can involve any physical connection and/or anchoring to the vehicle 102 that allows for subsequent headlight adjustment from a moving mechanism 206 connected to the headlight 104 in step 420.

Physical connection of the moving mechanism 206 to a selected portion of the headlight 104 in step 420 can coincide with the physical connection of a reference member 214 of a measuring assembly 204 with the headlight 104 so that the configuration of the headlight 104 corresponds with movement and orientation of the reference member 214. It is noted that the physical connections of step 420 can exclude other aspects of a measuring assembly 204, such as an optical source 212 and optical receptor 210, that do not move or rotate during adjustment of an adjacent headlight 104. The physical positioning of step 410 and connections of step 420 are followed in step 430 with a signal connection of the moving mechanism 206 and measuring assembly 204 to an adjust system 202. The connections of step 430 are not required to be physical connections and can correspond with the formation of signal pathways via wired and/or wireless components. It is noted that the connections established in steps 420 and 430 can be conducted in any order, such as signal connections being formed with an adjust system 202 before physical connections with a headlight 104, moving mechanism 206, and measuring assembly 204.

At any time, the adjust system 202 of a headlight adjustment system 200 can create and store one or more calibration strategies 320 that proactively prescribe actions, tolerances, and sequences to adjust a headlight 104 over time to a predetermined orientation. Some embodiments generate a calibration strategy 320 with the adjust system 202 in step 440 after connections with the measuring assembly 204 and moving mechanism 206 that provide input information to the processor 310 of the adjust system 202. Other embodiments generate a calibration strategy 320 prior to any physical, signal, or electrical connection with a headlight 104 or headlight adjustment means.

Once the headlight 104 is installed and assorted aspects of the headlight adjustment system are connected, step 450 activates the optical source 212 of the measuring assembly 204. It is contemplated that the headlight 104 is positioned perfectly upon initial installation and requires no movement to align the headlight beam 106 within a predetermined threshold range. However, the adjust system 202 can identify a headlight 104 misalignment in step 450 by receiving a signal that an optical beam is reaching an optical receptor 210 of the measuring assembly 204. Such identified misalignment triggers the adjust system 202 to activate the moving mechanism 206 with a selected resolution, speed, and direction to alter the physical configuration of the headlight 104 in step 450.

The activation of the moving mechanism 206 can correspond with constant, intermittent, or burst movement of a headlight 104 while the measuring assembly 204 operates to emit one or more measuring beams towards at least one optical receptor 210. Such headlight 104 movement can continue for any amount of time and can involve a single action or a sequence of different actions. For instance, step 450 can operate the headlight moving mechanism 206 with a single direction, resolution, and speed until the reference member blocks the measuring beam from reaching the optical receptor 210 of the measuring assembly 204. Another example of step 450 carries out a calibration strategy 320 by progressing through different headlight 104 adjustment speeds and directions until the measuring beam is blocked by portions of the measuring assembly reference member 214.

At any time after beginning headlight 104 adjustment, decision 460 can evaluate if a modification to the action, or series of actions, can be altered to optimize headlight 104 alignment with a predetermined threshold. If a modification to current, or planned, headlight 104 motion can improve adjustment performance, such as speed, accuracy, or power consumption, step 470 enacts at least one change in accordance with one or more calibration strategies 320. That is, an adjust system 202 can change to a different calibration strategy 320 altogether in step 470 or alter an action of a single calibration strategy 320, such as changing movement resolution and speed. Once an alteration is conducted in step 470, decision 460 is revisited to evaluate if further modifications can optimize headlight 104 adjustment.

With no headlight 104 motion adjustments necessary, decision 480 evaluates if an optical signal is active in the optical receptor 210 of the measuring assembly 204. If no signal is active, the reference member 214 of the measuring assembly 204 has blocked the measuring beam and the headlight 104 has a designated configuration that corresponds with a headlight beam 106 that provides safe driving conditions. As such, step 490 deactivates the moving mechanism 206 to lock the headlight 104 into the configuration that blocked the measuring beam. In the event the optical beam is active and the reference member 214 has not blocked the beam from reaching the optical receptor 210, which corresponds with a misaligned headlight 104 and headlight beam 106, decision 460 is revisited to determine if changes to the headlight 104 movement actions can optimize the timing and accuracy of reaching the predetermined headlight 104 configuration. It is noted that a technician may reactivate automated adjustment, as discussed above, by returning routine 400 to step 450.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, random-access memory (RAM), ROM, flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

The invention claimed is:

1. A headlight adjustment system comprising:
   a headlight positioned in a vehicle;
   a measuring assembly attached to the headlight;
   an adjust system connected to the measuring assembly; and
   a moving mechanism connected to the adjust system and the headlight, the moving mechanism adapted to:
      physically alter a configuration of the headlight in response to an optical beam of the measuring assembly extending past a liquid opaque articulating reference member to an optical receptor connected to the adjust system, which extension of the optical beam past the liquid opaque articulating reference member indicates the headlight is misaligned; and
      deactivate the adjust system in response to a signal indicating that the optical beam is blocked by the liquid opaque articulating reference member, which blockage of the optical beam indicates the headlight is aligned.

2. The headlight adjustment system of claim 1, wherein the moving mechanism is an electric motor.

3. The headlight adjustment system of claim 1, further comprising an optical source that emits the optical beam, wherein the optical source is a laser.

4. The headlight adjustment system of claim 1, wherein the liquid opaque articulating reference member of the measuring assembly articulates in unison with the headlight.

5. The headlight adjustment system of claim 1, wherein the adjust system generates a calibration strategy to alter the configuration of the headlight.

6. The headlight adjustment system of claim 5, wherein the calibration strategy prescribes a change in headlight movement speed.

7. The headlight adjustment system of claim 5, wherein the calibration strategy prescribes a change in headlight movement resolution.

8. The headlight adjustment system of claim 5, wherein the calibration strategy prescribes a change in headlight movement direction.

9. The headlight adjustment system of claim 5, wherein the adjust system alters at least one headlight movement action of the calibration strategy in response to expiration of a timer.

* * * * *